United States Patent [19]
Gattuso et al.

[11] 3,883,592
[45] May 13, 1975

[54] THIOCARBAMYL SULFENAMIDES

[75] Inventors: Marion J. Gattuso, Hoffman Estates; Robert J. Arnold, Chicago, both of Ill.

[73] Assignee: Universal Oil Products Company, Des Plaines, Ill.

[22] Filed: Apr. 20, 1972

[21] Appl. No.: 246,049

[52] U.S. Cl. .... 260/567; 260/239 BA; 260/239 BF; 260/244 R; 260/247.1 T; 260/250 R; 260/250 A; 260/252; 260/256.5 R; 260/268 R; 260/279 R; 260/294.8 R; 260/302 SN; 260/304; 260/307 R; 260/308 R; 260/309; 260/310 R; 260/310 C; 260/326.12 R; 260/326.9; 260/329 S; 260/345.1; 260/347.2; 260/551 S; 260/785; 260/791; 260/792; 260/793
[51] Int. Cl. .......................................... C07d 87/46
[58] Field of Search .............. 260/247.1, 567, 551 S

[56] References Cited
UNITED STATES PATENTS

| | | | |
|---|---|---|---|
| 2,333,468 | 11/1943 | Cooper | 260/793 |
| 2,421,352 | 5/1947 | Paul et al. | 260/551 |
| 2,424,921 | 7/1947 | Smith et al. | 260/551 |
| 2,692,862 | 10/1954 | Lipsitz | 252/107 |
| 3,291,795 | 12/1966 | Whiton et al. | 260/247.1 |

*Primary Examiner*—G. Thomas Todd
*Attorney, Agent, or Firm*—James R. Hoatson, Jr.; Bernard L. Kramer; William H. Pager, II

[57] ABSTRACT

Thiocarbamyl sulfenamides having at least one aryl substituent attached to the sulfenamide nitrogen. The thus substituted thiocarbamyl sulfenamides are a new class of compounds which are stable in storage and are effective accelerators for the vulcanization of rubber formulations.

4 Claims, No Drawings

THIOCARBAMYL SULFENAMIDES

BACKGROUND OF THE INVENTION

The dialkylthiocarbamyl sulfenamides are effective accelerators for use in the vulcanization of rubber formulations. Various substituted thiocarbamyl sulfenamides have been proposed in the prior art for such use. In these, the substitutions attached to the sulfenamide nitrogen are alkyl, cycloalkyl or heterocyclic. Because of the characteristic instability in storage, these become difficult to handle due to loss of crystallinity, show decreased accelerator efficiency and have a tendency to cause premature curing.

DESCRIPTION OF THE INVENTION

It now has been found that certain new thiocarbamyl sulfenamides in which the amide group carries an aryl group are not only superior to the previously disclosed sulfenamides but are also free from the defect of storage instability common to the alkyl members of this class of compounds.

In one embodiment, the present invention relates to new thiocarbamyl sulfenamides, having at least one aryl substitutent attached to the sulfenamide nitrogen, of the formula:

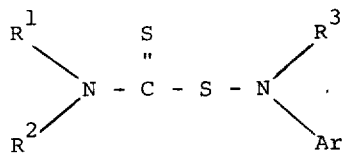

where $R^1$ and $R^2$ are selected from the group consisting of alkyl, cycloalkyl, aryl and heterocyclic, and $R^3$ is $R^1$, $R^2$ or hydrogen. The term aryl is employed in the generic sense to include radicals substituted in the carbocyclic nucleus; e.g., alkyl, alkoxy, nitro, chloro, bromo, fluoro, iodo, hydroxy, etc.

In another embodiment, the present invention relates to vulcanizable diene rubber formulation containing, as a vulcanization accelerator, a thiocarbamyl sulfenamide of the formula hereinbefore set forth.

Referring to the above formula, where $R^1$, $R^2$ and/or $R^3$ are alkyl, the alkyl contains from 1 to 10 or more carbon atoms and preferably from 1 to 4 carbon atoms each. Illustrative examples of compounds in which $R^1$ and $R^2$ are alkyl and $R^3$ is hydrogen include N,N-dimethylthiocarbamyl-N'-phenylsulfenamide, N.N-diethylthiocarbamyl-N' -phenylsulfenamide, N,N-dipropylthiocarbamyl-N'-phenylsulfenamide, N,N-dibutylthiocarbamyl-N'-phenylsulfenamide, N,N-dipentylthiocarbamyl-N'-phenysulfenamide, N,N-dihexylthiocarbamyl-N'-phenylsulfenamide, N,N-diheptylthiocarbamyl-N'-N'-phenylsulfenamide, N,N-dioctylthiocarbamyl-N'-phenylsulfenamide, N,N-dinonylthiocarbamyl-N'-phenylsulfenamide, N,N-didecylthiocarbamyl-N'-phenylsulfenamide, etc. In the above examples, $R^1$ and $R^2$ are the same alkyl groups. It is understood that these may be different alkyl groups as illustrated by N-methyl-N-ethylthiocarbamyl-N'-phenylsulfenamide, N-methyl-N-propylthiocarbamyl-N'-phenylsulfenamide, N-methyl-N-butylthiocarbamyl-N'-phenylsulfenamide, N-methyl-N-pentylthiocarbamyl-N'-phenylsulfenamide, N-methyl-N-hexylthiocarbamyl-N'-phenylsulfenamide, N-ethyl-N-propylthiocarbamyl-N'-phenylsulfenamide, N-ethyl-N-butylthiocarbamyl-N'-phenylsulfenamide, N-ethyl-N-pentylthiocarbamyl-N'-phenylsulfenamide, N-ethyl-N-hexylthiocarbamyl-N'-phenylsulfenamide, N-propyl-N-butylthiocarbamyl-N'-phenylsulfenamide, N-propyl-N-pentylthiocarbamyl-N'-phenylsulfenamide, N-propyl -N-hexylthiocarbamyl-N'-phenylsulfenamide, N-butyl-N-pentylthiocarbamyl-N'-phenylsulfenamide, N-butyl-N-hexylthiocarbamyl-N'-phenylsulfenamide, N-pentyl-N-hexylthiocarbamyl-N'-phenylsulfenamide, etc. While the phenyl substitution is preferred, it is understood that corresponding compounds in which the aryl group is naphthyl, anthracyl, etc., or substituted phenyl, naphthyl, etc., are included in the present invention.

In the embodiment where $R^1$, $R^2$ and $R^3$ are alkyl, illustrative compounds include, N,N-dimethylthiocarbamyl-N'-methyl-N'-phenylsulfenamide, N,N-diethylthiocarbamyl-N'-ethyl-N'-phenylsulfenamide, N,N-dipropylthiocarbamyl-N'-propyl-N'-phenylsulfenamide, N,N-dibutylthiocarbamyl-N'-butyl- N'-phenylsulfenamide, N,N-dimethylthiocarbamyl-N'-ethyl-N'-phenylsulfenamide, N,N-dimethylthiocarbamyl- N'-propyl-N'-phenylsulfenamide, N,N-dimethylthiocarbamyl-N'-butyl -N'-phenylsulfenamide, N,N-diethylthiocarbamyl-N'-methyl-N'-phenylsulfenamide, N,N-diethylthiocarbamyl-N'-propyl-N'-phenylsulfenamide, N,N-diethylthiocarbamyl-N'-butyl -N'-phenylsulfenamide, N,N-dipropylthiocarbamyl-N'-methyl-N'-phenylsulfenamide, N,N-dipropylthiocarbamyl-N'-ethyl-N'-phenylsulfenamide, N,N-dipropylthiocarbamyl-N'-butyl -N'-phenylsulfenamide, N,N-dibutylthiocarbamyl-N'-methyl-N'-phenylsulfenamiide, N,N-dibutylthiocarbamyl-N'-ethyl-N'-phenylsulfenamide, N,N-dibutylthiocarbamyl-N'-propyl -N'-phenylsulfenamide, N-methyl-N-ethylthiocarbamyl-N'-methyl-N'-phenylsulfenamide, N-ethyl-N-propylthiocarbamyl -N'-ethyl-N'-phenylsulfenamide, N-ethyl-N-propylthiocarbamyl -N'-propyl-N'-phenylsulfenamide, N-methyl-N-propylthiocarbamyl-N'-propyl-N'-phenylsulfenamide, N-methyl-N-butylthiocarbamyl-N'-butyl-N'-phenylsulfenamide, etc. It is understood that these specific compounds are for illustrative purposes only and that corresponding compounds in which the alkyl groups are different are also comprised within the present invention.

Referring to the above formula, where at least one of the R groups is cycloalkyl, the cycloalkyl contains from 3 to 12 and peferably 5 to 8 carbon atoms in the ring. Illustrative compounds in which the cycloalkyl is cyclohexyl include N-methyl-N-cyclohexylthiocarbamyl-N'-phenylsulfenamide, N-ethyl-N-cyclohexythiocarbamyl-N'-phenylsulfenamide, N-propyl-N-cyclohexylthiocarbamyl-N'-phenylsulfenamide, N-butyl-N-cyclohexylthiocarbamyl-N'-phenylsulfenamide, N,N-dicyclohexythiocarbamyl-N'-phenylsulfenamide, N,N-dicyclohexylthiocarbamyl-N'-methyl-N'-phenylsulfenamide, N,N-dicyclohexylthiocarbamyl-N'-ethyl-N'-phenylsulfenamide, N,N-dicyclohexylthiocarbamyl-N'-propyl-N'-phenylsulfenamide, N,N-dicyclohexylthiocarbamyl-N'-butyl-N'-phenylsulfenamide, N-methyl-n-cyclohexylthiocarbamyl-N'-methyl-N'-phenylsulfenamide, N-methyl-N- cyclohexylthiocarbamyl-N'-ethyl-N'-phenylsulfenamide, N-methyl-N-cyclohexylthiocarbamyl-N'-propyl-N'-phenylsulfenamide, N-methyl-N-cyclohexylthiocarbamyl-N'-butyl-N'-phenylsulfenamide, N-ethyl-N-cyclohexylthiocarbamyl-N'-methyl-N'-phenylsulfenamide, N-ethyl-N-cyclohexylthiocarbamyl-N'-ethyl-N'-phenylsulfenamide, N-ethyl-N-cyclohexylthiocarbamyl-N'-propyl-N'-phenylsulfenamide, N-ethyl-N-cyclohexylthiocarbamyl-N'-butyl-N'-phenylsulfenamide, N-propyl-N-cyclohexylthiocarbamyl-N'-methyl-N'-phenylsulfenamide, N-propyl-N-cyclohexylthiocarbamyl-N'-ethyl-N'-phenylsulfenamide, N-propyl-N-cyclohexylthiocarbamyl-N'-propyl-N'-phenylsulfenamide, N-propyl-N-cyclohexylthiocarbamyl-N'-butyl-N'-phenylsulfenamide, N-butyl-N-cyclohexylthiocarbamyl-N'-methyl-N'-phenylsulfenamide, N-butyl-N-cyclohexylthiocarbamyl-N'-ethyl-N'-phenylsulfenamide, N-butyl-N-cyclohexylthiocarbamyl-N'-propyl-N'-phenylsulfenamide, N-butyl-N-cyclohexylthiocarbamyl-N'-butyl -N'-phenylsulfenamide, N,N-dicyclohexylthiocarbamyl-N'-cyclohexyl-N'-phenylsulfenamide, etc. It is understood that, in place of cyclohexyl, other cycloalkyls containing 3 to 5 or 7 to 12 carbon atoms in the ring may be used and also that other alkyl and/or other aryl groups may replace those in the specific compounds set forth above.

When one or more of the R groups is aryl, it preferably is phenyl but, as hereinbefore set forth, may comprise naphthyl, anthracyl, etc. Illustrative compounds in which one or more of the R groups is phenyl include N,N-diphenylthiocarbamyl-N'-phenylsulfenamide, N,-N-diphenylthiocarbamyl-N',N'-diphenylsulfenamide, N-alkyl-N-phenylthiocarbamyl-N'-phenylsulfenamide, N-alkyl-N-phenylthiocarbamyl-N',N'-diphenylsulfenamide, N-alkyl-N-phenylthiocarbamyl-N' -alkyl-N'-phenylsulfenamide, N-alkyl-N-phenylthiocarbamyl-N'-cycloalkyl-N'-phenylsulfenamide, N,N-dicycloalkylthiocarbamyl-N',N'-diphenylsulfenamide, N-alkyl-N-cycloalkylthiocarbamyl-N',N'-diphenylsulfenamide, etc., in which the alkyl and cycloalkyl groups are selected from those hereinbefore set forth and in which the phenyl may be replaced by a different aryl as also hereinbefore set forth.

Referring to the above formula, when one or more of the R groups is heterocyclic, these may be individual heterocyclic moieties or $R^1$ and $R^2$ together may form a heterocyclic moiety, preferably containing from 3 to 8 carbon atoms. In a particularly preferred embodiment, $R^1$ and $R^2$ comprise the residual elements of a morpholino configuration which may be described as an oxydiethylene substitution. This configuration as attached to the nitrogen atom is illustrated in the following formula:

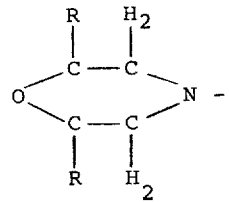

where R is hydrogen or alkyl of 1 to 10 carbon atoms.

Other heterocyclic substitutions in which $R^1$ and $R^2$ together form the cyclic structure may be derived from pyrrole, pyrazole, triazole, dioxazole, piperazine, isoxazine, azepine, indole, isoindazole, benziosoxazine, purine, etc. The above are examples in which the nitrogen atom forms a heterocyclic ring together with $R^1$ and $R^2$. Where one or more of the R groups comprise heterocyclic rings, the heterocyclic may contain one or more of nitrogen, oxygen or sulfur in the ring. Illustrative examples in this embodiment are derived from the heterocyclic compounds hereinbefore set forth, as well as from pyridine, pyradazine, pyrimidine, pyrazine, acridine, imidazole, furan, pyran, thiophene, oxazole, thiazole, benzothiazole, 3-aZabicyclo [3.2.2] non-3-yl, hexahydro-1H-azepin-1-yl, hexahydro-2H-azocin-1-yl, octahydro-1H-azonin-1-yl, etc.

These new thiocarbamyl sulfenamides are prepared in any suitable manner. In one method, the unsubstituted, alkyl or cycloalkyl derivative is prepared first and then either exchanged with an aryl amine or reacted with an acid salt of the aryl amine to form the substituted thiocarbamyl sulfenamide of the present invention. This preparation may be illustrated, but not meant to be limiting, by the following series of equations.

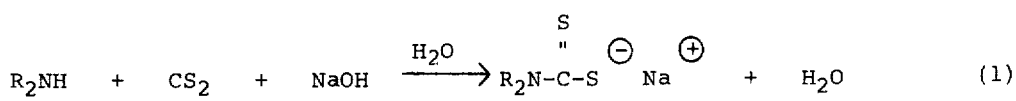

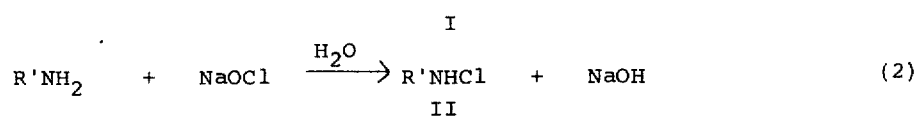

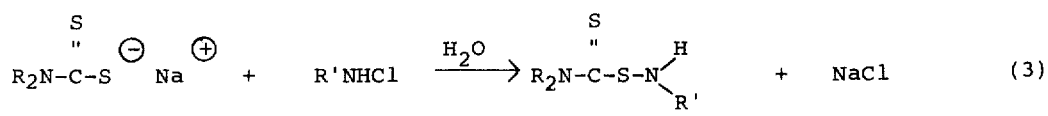

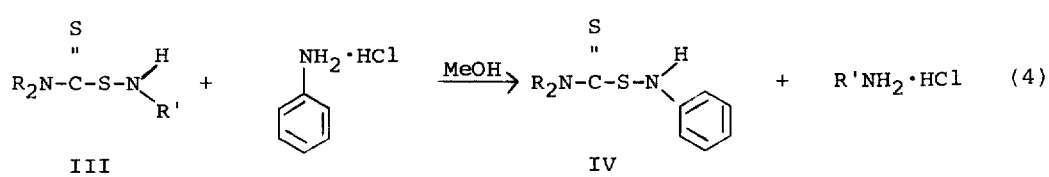

As a specific preparation in accordance with the above equations, dimethyl amine is reacted with carbon disulfide and sodium hydroxide to form the sodium N,N-dimethyldithiocarbamate (I). Cyclohexyl amine is reacted with sodium hypochlorite to form the N-chlorocyclohexyl amine (II). The dimethyldithiocarbamate is reacted with the monochlorocyclohexyl amine to form the N,N-dimethylthiocarbamyl-N'-cyclohexylsulfenamide (III). In Equation IV the N,-N-dimethylthiocarbamyl-N'-cyclohexylsulfenamide is reacted with aniline hydrochloride in the presence of methanol solvent to form N,N-dimethylthiocarbamyl-N'-phenylsulfenamide. Reactions (1), (2) and (3) are described in the literature as, for example, by Smith et al., J. Org. Chem., 14, 935 (1949) and in U.S. Pat. Nos. 2,388,236; 2,424,921; 3,590,030 and others. Accordingly, these reactions need not be described further herein, with the understanding that the details of preparation disclosed in these patents are embodied herein by reference.

As described in Equation (4), the unsubstituted, cyclohexyl or alkyl derivative is converted to the aryl derivative. This reaction occurs readily and in short times which may range from 5 minutes to less than one hour and more particularly from 10 minutes to 30 minutes. The reaction is readily effected at room temperature although, when desired, a higher temperature may be used which preferably is below about 100°C. The reaction is effected by forming a solution or slurry of one or both of the reactants, which may be mildly heated to facilitate solubility. Any suitable solvent may be utilized and conveniently comprises an alcohol as methanol, ethanol, propanol, butanol, etc., a ketone as acetone, methylethyl ketone, diethyl ketone, etc., ethers, dioxane, etc. or mixtures of these with water. The solvent employed preferably is one in which both reactants are mutually soluble, although partial solubility of the reactants in the solvent may be satisfactory as with water, ether, etc., but may require longer time in mixing to insure complete reaction. Because the solvent subsequently is removed by evaporation, it is preferred to use a lower boiling solvent for ready evaporation from the product.

The thiocarbamyl-alkylsulfenamide and aryl amine acid salt are reacted in equimolar proportions. However, an excess of either reactant may be employed, which excess generally will not exceed 4:1 molar proportions and thus, the reactants may be used in a mole proportion of 1:1 to 4:1.

In the specific reaction illustrated by Equation (4), aniline hydrochloride is used as the acid salt. It is understood that any suitable acid salt of the aryl amine may be used. Other acid salts include the hydrobromide, hydroiodide, sulfate, phosphate, nitrate, arsenate, borate, hydrocyanate, hydrosulfide, carbonate, as well as organic acid salts and particularly the formate, acetate, propionate, butyrate, oxalate, malonate, malate, citrate, lactate, benzoate, etc.

In place of reacting the cyclohexyl or alkyl derivative with the aryl amine acid salt, in another method this reaction is effected by the interchange of an aryl amine, particularly aniline, with the unsubstituted derivative. This reaction is effected at a temperature of from about 30° to about 100°C. and conveniently is accomplished by heating the mixture of reactants to reflux in the presence of a suitable solvent. A particularly preferred solvent is benzene. Other solvents include n-pentane, methylpentane, dimethylpentane, n-hexane, methylhexane, n-heptane, methanol, ethanol, propanol, ethyl ether, propyl ether, etc. It is understood that any suitable solvent which boils at a temperature of from about 30° to about 100°C. may be used. Atmospheric, subatmospheric or superatmospheric pressure may be used. In this reaction, ammonia is evolved and is continuously removed from the reaction environment in any suitable manner, preferably by adsorption by molecular sieve or other suitable adsorbent.

In still another method, the aryl derivative is prepared by oxidative condensation in which the sodium N,N-dialkyldithiocarbamate is reacted with an aryl amine in the presence of an alcohol solvent and alkali metal hypochlorite at a temperature below 0°C. Methanol is the preferred solvent. Other alcohol solvents included ethanol, propanol, butanol, etc. In still another method, N-monochloroaniline is added to the sodium dialkyldithiocarbamate. In still another method, a sulfenyl chloride is formed by the chlorination of the desired tetra-substituted thiuram disulfide and then reacted with an aryl amine to form the aryl substituted thiocarbamyl sulfenamide.

From the above description, it will be seen that the present invention embodies a number of new substituted thiocarbamyl sulfenamides in which at least one of the sulfenamide substituents is aryl and particularly phenyl. In addition to the specific compounds hereinbefore set forth, it is understood that the aryl ring or rings may contain substitutions thereon, which substitutions will not react under the conditions of preparation. Such substitutions include particularly one or two alkyls of 1 to 10 and preferably 1 to 4 carbon atoms each, one or two alkoxy groups of 1 to 10 and preferably 1 to 4 carbon atoms each, dialkylamino in which each alkyl contains from 1 to 10 and preferably from 1 to 4 carbon atoms, one or two thioalkyl groups in which the alkyl contains from 1 to 10 and preferably from 1 to 4 carbon atoms each, etc.

As hereinbefore set forth, the novel thiocarbamyl sulfenamides of the present invention are particularly advantageous for use as accelerators in rubber formulations. These thiocarbamyl sulfenamides are stable in storage and accordingly are readily available for use. Such use is particularly desirable when a phenylenediamine antiozonant is incorporated in the rubber formulation because the anti-ozonant decreases the scorch time. The vulcanized rubber products are of good physical properties, as will be illustrated in the examples appended to the present specifications.

The new thiocarbamyl sulfenamides of the present invention may be used in any vulcanizable diene rubber formulation. Illustrative vulcanizable rubbers include styrene-butadiene copolymer (SBR); copolymer of butadiene and acrylonitrile (MBR); copolymers of butadiene or isoprene with alpha-methylstyrene, ring substituted styrenes, chloromethylstyrene, etc.; butadiene-isoprene copolymer; isobutylene-isoprene copolymer; isobutylene-cyclopentadiene copolymer; vinylpyridines; polybutadiene; synthetic polyisoprene; ethylene-propylene-diene terpolymers (EPDM); natural rubber; etc.

Although sulfur is a preferred vulcanizing agent, it is understood that the accelerator of the present invention may be used in efficient vulcanization systems in which the compounds hereinbefore set forth are used as the vulcanization agent themselves or in combination with sulfur-donor vulcanization agents alone or in admixture with lesser amounts of sulfur. These systems are generally referred to as "sulfurless" or "low sulfur" vulcanization systems. In such systems the vulcanizing agent is usually of the thiuram type such as tetramethylthiuram sulfide, tetramethylmonothiuram disulfide, dimethyldiphenylthiuram disulfide, dipentamethylenethiuram tetrasulfide, etc.

The accelerator of the present invention is used in any suitable concentration and may be within the range of from about 0.05 to about 5 and preferably from about 0.1 to about 1.5 parts per 100 parts of rubber hydrocarbon. It is understood that the rubber formulation also may contain conventional ingredients including, in addition to the accelerator of the present invention, carbon, zinc oxide, sulfur, stearic acid, antioxidant, antiozonant, additional conventional accelerators, etc., all of these being used in conventional concentrations. Following the mixing of the rubber formulation, the mixture is subjected to vulcanization in conventional manner.

The following examples are introduced to illustrate further the novelty and utility of the present invention but not with the intention of unduly limiting the same.

EXAMPLE I

Sodium N,N-diethyldithiocarbamate was prepared by adding carbon disulfide, dropwise with stirring and mild cooling (20°–30°C.), to an aqueous solution of equimolar quantities of sodium hydroxide and diethyl amine. The reaction is believed to be quantitative with the carbamate being soluble in water to the extent of about two moles per liter.

N,N-diethylthiocarbamyl-N'-cyclohexylsulfenamide was prepared as follows. One mole of N-monochlorocyclohexyl amine in about 500 ml of water was prepared by the dropwise addition of 1320 g. of a 5.6% solution of sodium hypochlorite (1.0 mole) to 109 g. (1.1 mole) of cyclohexyl amine. The reaction mixture was maintained at 0°–10°C. throughout the preparation. Then, 1.0 mole of the sodium N,N-diethyldithiocarbamate, prepared as described above, was added dropwise with vigorous mixing to 1.0 mole of the monochlorocyclohexyl amine in about 300 ml of water. The resultant N,N-diethylthiocarbamyl-N'-cyclohexylsulfenamide was recovered in 77% yield, having a melting point of 63°–65°C. which corresponds to the literature melting point of 64°–65°C. Elemental analyses showed 53.62% carbon, 8.99% hydrogen and 26.02% sulfur, which correspond to the calculated values of 52.61% carbon, 8.95% hydrogen and 26.2% sulfur.

N,N-diethylthiocarbamyl-N'-phenylsulfenamide was prepared by dissolving 32.5 g. (0.25 mole) of aniline hydrochloride in 100 ml of methanol and filtering the resulting solution into a flask containing 54.5 g. (0.25 mole) of N,N-diethylthiocarbamyl-N'-cyclohexylsulfenamide in methanol. On stirring, a fine crystalline precipitate formed which was isolated by filtration to afford 58 percent yield of N,N-diethylthiocarbamyl-N'-phenylsulfenamide having a melting point of 93.5°–95°C. Elemental analyses showed 54.96% carbon, 6.70% hydrogen and 26.68% sulfur, which correspond to the calculated values of 54.83% carbon, 6.81% hydrogen and 26.8% sulfur.

EXAMPLE II

N,N-dimethylthiocarbamyl-N'-phenylsulfenamide was prepared in substantially the same manner as described in Example I except that N,N'-dimethyl amine was used as a reactant. The  dimethyldithiocarbamate was reacted with N-chlorocyclohexyl amine to form the N,N-dimethylthiocarbamyl-N'-cyclohexylsulfenamide, which then was reacted with aniline hydrochloride to form N,N-dimethylthiocarbamyl-N'-phenylsulfenamide, which was recovered in 78.3% yield and had a melting point of 82°–84°C. Elemental analyses showed 50.31% carbon, 5.83% hydrogen and 31.1% sulfur, which correspond to the calculated values of 50.91% carbon, 5.70% hydrogen and 30.2% sulfur.

EXAMPLE III

In this example, N-oxydiethylenethiocarbamyl-N'-phenylsulfenamide was prepared by the same general method described in the previous examples. Initially, N-oxydiethylenethiocarbamyl-N'-cyclohexylsulfenamide was prepared as follows. One mole of N-monochlorocyclohexyl amine in about 500 ml of water was prepared by the dropwise addition of 1,320 g. of a 5.6% solution of sodium hypochlorite (1.0 mole) to 109 g. (1.1 mole) of cyclohexyl amine. The reaction mixture was maintained at 0°–10°C. throughout the addition. To this chloro amine 1.0 mole of sodium N-oxydiethylenedithiocarbamate in about 300 ml of water was added dropwise with vigorous mixing. The resulting sulfenamide was collected by filtration and dried by pressing between filter paper. This afforded 162 g. (62.3%) of the crude product as a light yellow solid. Recrystallization from methanol gave dense colorless crystals, melting point 84°–85.5°C. which corresponds to the melting point reported in the literature of 85°–86°C. Elemental analyses showed 50.20% carbon, 7.83% hydrogen and 25.1% sulfur, which correspond to the calculated values of 50.73% carbon, 7.74% hydrogen and 24.6% sulfur.

N-oxydiethylenethiocarbamyl-N'-phenylsulfenamide was prepared as follows. Aniline hydrochloride, 32.5 g. (0.25 mole), was dissolved in 100 ml of methanol and the resulting solution was filtered into a lask containing 65 g. (0.25 mole) of N-oxydiethylenethiocarbamyl-N'-cyclohexylsulfenamide in methanol. On stirring, a fine crystalline precipitate formed, which was isolated by filtration to afford 60 g. (96 percent yield) of product. Purification was effected by passing an ethereal solution of the sulfenamide through a short column of neutral alumina, followed by recrystallization in methanol. Melting point of the purified material was 133°–135.5°C. Elemental analyses showed 51.79% carbon, 5.64% hydrogen and 25.8% sulfur, which correspond to the calculated values of 51.94% carbon, 5.55% hydrogen and 25.2% sulfur.

EXAMPLE IV

N,N-diphenylthiocarbamyl-N'-phenylsulfenamide is prepared in substantially the same manner as described in Example I except that diphenyl amine is utilized as a reactant instead of diethyl amine.

EXAMPLE V

N,N-dimethylthiocarbamyl-N'-(p-methoxyphenyl) sulfenamide is prepared in substantially the same manner as described in Example II except that p-methoxyaniline hydrochloride is utilized as a reactant instead of aniline hydrochloride.

EXAMPLE VI

N,N-dimethylthiocarbamyl-N',N'-diphenylsulfenamide is prepared in substantially the same manner as described in Example II except that diphenyl amine hydrochloride is utilized as the reactant instead of aniline hydrochloride.

EXAMPLE VII

N,N-diisopropylthiocarbamyl-N'-phenylsulfenamide is prepared in substantially the same manner as described in Example I except that the N,N-diisopropylthiocarbamyl-N'-tertbutylsulfenamide is prepared in conventional manner and then reacted with aniline hydrochloride in the method described in Example I.

EXAMPLE VIII

As hereinbefore set forth, the novel aryl substituted thiocarbamyl sulfenamides of the present invention are effective accelerators for the vulcanization of rubber formulations. The rubber formulation used in this example is of the following recipe:

TABLE I

| Ingredient | Parts by Weight |
|---|---|
| SBR 1502 | 100 |
| Furnace Black | 40 |
| Oil Extender | 10 |
| Zinc Oxide | 3 |
| Stearic Acid | 2 |
| Sulfur | 2 |
| Accelerator | 0.9 |

The ingredients were incorporated by conventional milling procedure and the formulation was cured for 40 minutes at 140°C.

The scorch values were determined in a small rotor Mooney viscometer at 121°C. The values represent the number of minutes for a rubber containing curing agent to increase in viscosity by 5 and then by 20 points. This method simulates conditions encountered during milling. A high scorch value indicates a high resistance to scorching. In addition, the physical properties of the cured rubber were determined.

The following table reports the results of evaluations made with a rubber formulation as hereinbefore set forth in which three different accelerators of the present invention were used. The accelerator was used in a concentration of 0.9 phr (parts per 100 parts of rubber hydrocarbon). For comparative purposes, evaluations also were made using 0.9 phr of N-cyclohexylbenzothiazole-2-sulfenamide which is used commercially as an accelerator. The results of these evaluations in the rubber formulation set forth above are reported in the following table:

TABLE II

| Run No. | Mooney Scorch | | Shore A Hardness | Ultimate Elongation, % | Modulus (psi) | | Tensile Strength (psi) |
|---|---|---|---|---|---|---|---|
| | 5 pt. | 20 pt. | | | 200% | 300% | |
| 1 | 73.5 | 89.1 | 51.0 | 860 | 325 | 540 | 2350 |
| 2 | 56.8 | 68.1 | 58.0 | 655 | 585 | 1070 | 2675 |
| 3 | 101.1 | 121.3 | 51.0 | 1000+ | 165 | 300 | 1165 |
| 4 | 76.3 | 90.9 | 56.0 | 770 | 465 | 835 | 2650 |

In the above table, the accelerators used are as follows:

Run No. 1 — N-cyclohexylbenzothiazole-2-sulfenamide
Run No. 2 — N,N-dimethylthiocarbamyl-N'-phenylsulfenamide
Run No. 3 — N,N-diethylthiocarbamyl-N'-phenylsulfenamide
Run No. 4 — oxydiethylenethiocarbamyl-N'-phenylsulfenamide From the data in the above table, it will be seen that the scorch properties in all cases provides sufficient time for the safe handling of the rubber formulation prior to curing. The accelerators in Run Nos. 2 and 4 resulted in considerably higher moduli and tensile strength than obtained with the cyclohexylbenzothiazolesulfenamide used in Run No. 1.

EXAMPLE IX

As hereinbefore set forth, phenylenediamine antiozonants included in the rubber formulation decreased the scorch time. Accordingly, it would comprise an additional advantage when an accelerator also served to offset this decrease in scorch time. The following table reports the results of evaluations made in the same manner as described in Example VIII using the same rubber formulation except that it also included 2 phr of N,N'-di-2-octyl-p-phenylenediamine antiozonant and the accelerator was used in a concentration of 1.25 phr. Here again, the results using N-cyclohexylbenzothiazole-2-sulfenamide are included for comparative purposes.

TABLE III

| Run No. | Mooney Scorch | | Shore A Hardness | Ultimate Elongation, % | Modulus (psi) | | Tensile Strength (psi) |
|---|---|---|---|---|---|---|---|
| | 5 pt. | 20 pt. | | | 200% | 300% | |
| 5 | 20.7 | 23.2 | 59.0 | 520 | 715 | 1140 | 2235 |
| 6 | 29.8 | 35.0 | 59.0 | 505 | 740 | 1265 | 2225 |
| 7 | 52.8 | 61.9 | 55.0 | 645 | 585 | 1015 | 2425 |
| 8 | 37.7 | 43.4 | 59.0 | 475 | 725 | 1215 | 1985 |

The accelerators used in the above runs are as follows:

centration of 0.9 phr but no phenylenediamine antiozonant was used.

TABLE V

| Run No. | Mooney Scorch | | Physical Properties | | | | |
|---|---|---|---|---|---|---|---|
| | 5 pt. | 20 pt. | Shore A Hardness | Ultimate Elongation, % | Modulus (psi) 200% | 300% | Tensile Strength (psi) |
| 9 | 4.9 | 6.9 | 62 | 455 | 1040 | 1850 | 3275 |
| 10 | 8.6 | 11.6 | 60 | 505 | 850 | 1435 | 3205 |
| 11 | 6.6 | 8.9 | 60 | 505 | 845 | 1510 | 3140 |

Run No. 5 — N-cyclohexylbenzothiazole-2-sulfenamide

Run No. 6 — N,N-dimethylthiocarbamyl-N'-phenylsulfenamide

Run No. 7 — N,N-diethylthiocarbamyl-N'-phenylsulfenamide

Run No. 8 — oxydiethylenethiocarbamyl-N'-phenylsulfenamide

Referring to the data in the above table, it will be noted that the phenyl substituted accelerators of the present invention considerably increased the scorch time as compared to Run No. 5.

EXAMPLE X

The aryl substituted thiocarbamyl sulfenamides of the present invention also were evaluated in a natural rubber stock of the following recipe:

TABLE IV

| Ingredient | Parts by Weight |
|---|---|
| Pale Crepe | 100 |
| Furnace Black | 45 |
| Oil Extender | 10 |
| Zinc Oxide | 3.1 |
| Stearic Acid | 3 |
| Sulfur | 2.5 |
| Accelerator | 0.9 |

The scorch values were determined with a large rotor Mooney viscometer at 135°C. In the runs reported in the following table, the accelerator was used in a con- The accelerators used in the above runs are as follows:

Run No. 9 — N,N-dimethylthiocarbamyl-N'-phenylsulfenamide

Run No. 10 — N,N-diethylthiocarbamyl-N'-phenylsulfenamide

Run No. 11 — oxydiethylenethiocarbamyl-N'-phenylsulfenamide

EXAMPLE XI

Another series of evaulations was made in the same rubber formulation described in Example X except that the rubber formulation included 2 phr of N,N'-di-2-octyl-p-phenylenediamine antiozonant. Here again, the accelerator was used at the low concentration of 0.9 phr. The results of these evaluations are reported in the following table.

TABLE VI

| Run No. | Mooney Scorch | | Physical Properties | | | | |
|---|---|---|---|---|---|---|---|
| | 5 pt. | 20 pt. | Shore A Hardness | Ultimate Elongation, % | Modulus (psi) 200% | 300% | Tensile Strength (psi) |
| 12 | 5.4 | 7.2 | 59 | 485 | 970 | 1805 | 3445 |
| 13 | 7.7 | 9.8 | 59 | 525 | 845 | 1595 | 3465 |
| 14 | 7.0 | 8.8 | 60 | 495 | 875 | 1600 | 3225 |

The accelerators used in the above runs are as follows:

Run No. 12 — N,N-dimethylthiocarbamyl-N'-phenylsulfenamide

Run No. 13 — N,N-diethylthiocarbamyl-N'-phenylsulfenamide

Run No. 14 — oxydiethylenethiocarbamyl-N'-phenylsulfenamide

We claim as our invention:

1. N,N-dialkylthiocarbamyl-N'-phenylsulfenamide in which each alkyl contains from 1 to 10 carbon atoms.

2. A compound as defined in claim 1 further characterized in that the alkyls are methyl.

3. A compound as defined in claim 1 further characterized in that the alkyls are ethyl.

4. A compound as defined in claim 1 further characterized in that the alkyls are isopropyl.

* * * * *